United States Patent
Andres et al.

(10) Patent No.: US 9,912,019 B2
(45) Date of Patent: Mar. 6, 2018

(54) THERMAL MANAGEMENT OF ELECTRICAL STORAGE DEVICES BY COOLANT POOL

(71) Applicant: Hamilton Sundstrand Corporation, Charlotte, NC (US)

(72) Inventors: Michael J. Andres, Rockford, IL (US); Robert Scott Downing, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1045 days.

(21) Appl. No.: 13/898,010

(22) Filed: May 20, 2013

(65) Prior Publication Data

US 2014/0342197 A1     Nov. 20, 2014

(51) Int. Cl.
*H01M 2/12*        (2006.01)
*H01M 10/613*      (2014.01)
*H01M 10/653*      (2014.01)
*H01M 10/6569*     (2014.01)
*H01M 10/6551*     (2014.01)
*H01M 10/6567*     (2014.01)
*H01M 10/6555*     (2014.01)
(Continued)

(52) U.S. Cl.
CPC ..... *H01M 10/5004* (2013.01); *H01M 10/613* (2015.04); *H01M 10/653* (2015.04); *H01M 10/6551* (2015.04); *H01M 10/6555* (2015.04); *H01M 10/6567* (2015.04); *H01M 10/6569* (2015.04); *H01M 2/1223* (2013.01); *H01M 10/647* (2015.04); *H01M 10/6571* (2015.04)

(58) Field of Classification Search
CPC .......... H01M 10/5004; H01M 10/613; H01M 10/653; H01M 10/6551; H01M 10/6555; H01M 10/6567; H01M 10/6569; H01M 10/5075; H01M 10/647; H01M 10/6571; H01M 2/1223; H01M 10/60; H01M 10/61; H01M 10/617; H01M 10/6557
See application file for complete search history.

(56) References Cited

U.S. PATENT DOCUMENTS 2,273,244 A      2/1942   Ambruster
6,033,800 A *    3/2000   Ichiyanagi .......... H01M 2/0207
                                                  429/120
(Continued)

FOREIGN PATENT DOCUMENTS

AT   WO 2011073424 A1 *   6/2011   .............. H01M 2/12
DE         2657183 A1 *   6/1978   .............. F28D 7/00
(Continued)

OTHER PUBLICATIONS

DE 2657183 A1 English Translation, Obtained Sep. 25, 2015 via EPO.*

(Continued)

*Primary Examiner* — Jimmy K Vo
(74) *Attorney, Agent, or Firm* — Cantor Colburn LLP

(57) ABSTRACT

A battery system including a passive cooling system for cooling a plurality battery cells during normal operation and during overheating of the battery cells. The passive cooling system may include a housing, a cooling fluid (coolant pool) within the housing, and a plurality of dividers between each of the plurality of battery cells.

18 Claims, 2 Drawing Sheets

(51) Int. Cl.
*H01M 10/647* (2014.01)
*H01M 10/6571* (2014.01)

(56) References Cited

U.S. PATENT DOCUMENTS

| | | | |
|---|---|---|---|
| 6,330,925 B1 * | 12/2001 | Ovshinsky | B60K 6/24 180/65.245 |
| 2006/0063067 A1 * | 3/2006 | Kim | H01M 2/021 429/148 |
| 2008/0193830 A1 * | 8/2008 | Buck | H01M 2/1077 429/120 |
| 2009/0176148 A1 | 7/2009 | Jiang et al. | |
| 2010/0151307 A1 * | 6/2010 | Naganuma | H01M 2/1072 429/99 |
| 2012/0003522 A1 * | 1/2012 | Fuhr | H01M 2/1077 429/120 |
| 2012/0263984 A1 * | 10/2012 | Krammer | H01M 2/12 429/82 |
| 2013/0115489 A1 | 5/2013 | Krause et al. | |

FOREIGN PATENT DOCUMENTS

| | | | | |
|---|---|---|---|---|
| FR | 2977378 A1 | | 1/2013 | |
| GB | 738110 A | * | 10/1955 | H01M 2/0245 |

OTHER PUBLICATIONS

Author Unknown, 3M Fluorinert™ Electronic Liquid FC-70, 3M Performance Materials, May 2000, pp. 1-4.
Extended European Search Report for related EP Application No. 14169029.7-1360, dated Sep. 23, 2014, pp. 1-7.

* cited by examiner

US 9,912,019 B2

THERMAL MANAGEMENT OF ELECTRICAL STORAGE DEVICES BY COOLANT POOL

TECHNICAL FIELD

The present teachings relate to the field of battery systems and, more particularly, to heat control of battery systems during normal and abnormal operation.

BACKGROUND

Vehicle batteries and capacitors have moved to increasingly energetic chemistries to improve power density. Batteries of this design may have a decrease in volume and weight for a given power capacity. However, batteries using chemistries such as lithium cobalt oxide having certain less than desirable characteristics. For example, an upper operating temperature of a battery employing one of these chemistries may be above the battery's thermal breakdown temperature. This characteristic may result in thermal runaway of the battery and the potential for serious consequences such as power failure or fire.

External active cooling of the batteries is generally not an acceptable solution. In addition to supplying power to normal operating systems, the batteries also provide emergency power, for example, in aviation uses. During emergency power operation, other systems, including cooling systems, may not be operating. Terminating cooling system operations during an emergency operation saves power for the operation of more critical systems but may result in overheating of the battery during the supply of emergency power.

A method and structure for controlling the overheating of batteries during operation, for venting harmful gasses in case of thermal runaway, and for providing notification of battery overheating would be desirable.

SUMMARY

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment of the present teachings, a battery system can include a sealed housing, at least a first battery cell and a second battery cell, wherein the first battery cell and the second battery cell are sealed within the housing, at least one divider sealed within the housing and interposed between the first battery cell and the second battery cell, wherein the at least one divider is spaced apart from a top surface of the sealed housing by a first gap and from a bottom surface of the sealed housing by a second gap, and a dielectric cooling fluid sealed within the housing, wherein the cooling fluid physically contacts the first battery cell, the second battery cell, the at least one divider, and the housing.

In another embodiment, a battery system can include a sealed housing having an interior and an exterior, a plurality of battery cells sealed within the interior of the sealed housing, a plurality of dividers sealed within the interior of the housing, wherein each battery cell is separated from an adjacent battery cell by one of the dividers and the plurality of dividers are spaced apart from a top surface of the sealed housing by a first gap and from a bottom surface of the sealed housing by a second gap, a dielectric cooling fluid sealed within the housing, wherein the cooling fluid physically contacts the plurality of battery cells, the plurality of dividers, and the housing, an exhaust vent exterior to the housing, a pressure relief device interposed within a fluid channel between the dielectric coolant fluid and the exhaust vent, wherein the exhaust vent is in fluid communication with the interior of the housing upon activation of the pressure relief device.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

In an embodiment of the present teachings, a passive battery cooling system may assist in maintaining a relatively low battery temperature within a power system in a vehicle. In an embodiment, an internal sensor may provide notification if a battery temperature exceeds a temperature preset. A burst disk or other technique can be used to relieve excessive pressure within a battery containment system, and gasses may be vented from the containment system to a location external to the vehicle.

Figure 1:
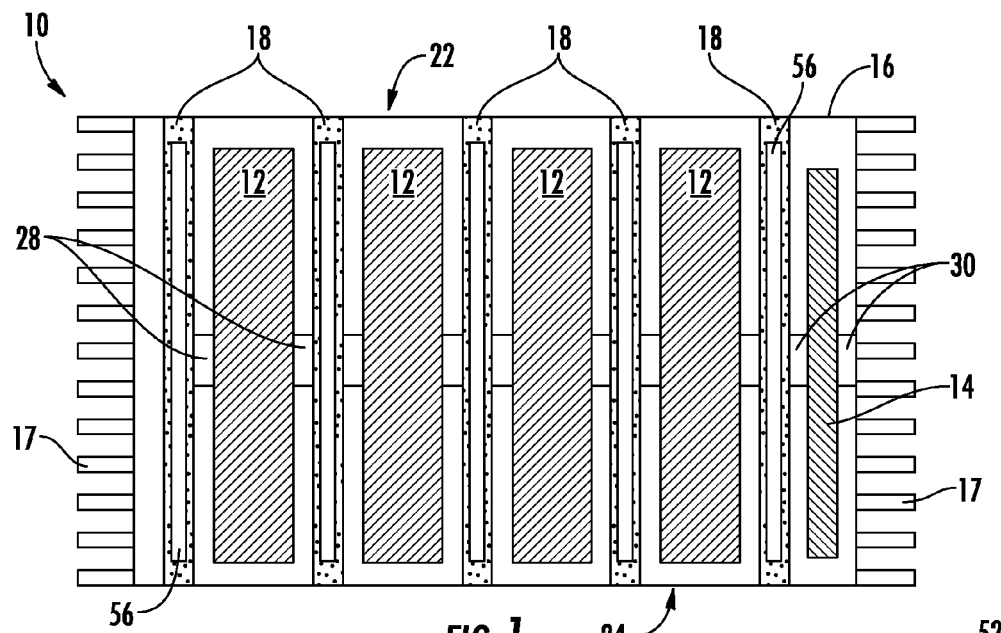
FIG. 1 is a horizontal cross section.
Figure 2:
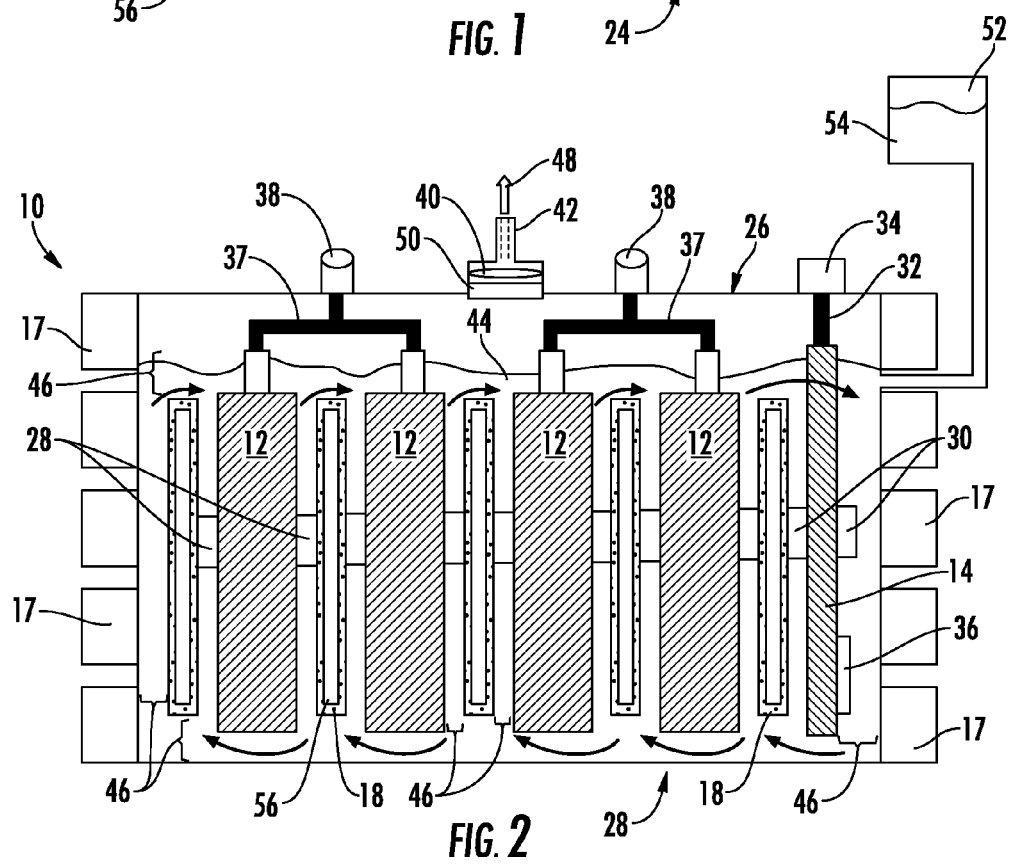
FIG. 2 is a vertical cross section, depicting a battery system in accordance with an embodiment of the present teachings.

An embodiment of the present teachings is depicted in the horizontal cross section of FIG. 1 and the vertical cross section of FIG. 2. The battery system 10 of FIG. 1 includes a plurality of battery cells 12, control electronics 14, for example a printed circuit board (PCB), and a sealed housing 16 that encloses the plurality of battery cells. The control electronics 14 may be enclosed within the sealed housing 16 as depicted, or located external to the housing 16. The housing 16 may include cooling fins 17 on one or more external surfaces to improve passive cooling efficiency.

As depicted in FIGS. 1 and 2, each battery cell 12 is interposed between a pair of dividers 18 that may be attached at either end to the housing 16, for example with a screw or an adhesive (not individually depicted for simplicity). In another embodiment, the dividers 18 may be molded as a single piece along with the housing 16. As depicted in FIG. 1, each divider 18 extends horizontally between a front surface 20 and a back surface 22 of the housing 16. As depicted in FIG. 2, each divider is suspended between, but does not physically contact, a top surface 24 and a bottom surface 26 of the housing 16. In other words, each divider 18 is separated or spaced apart from the top surface 24 and the bottom surface 26 of the housing 16 by a gap.

One or more mounts 28 may be used to attach each battery cell 12 to the adjacent dividers 18. The mounts 28 position each battery cell 12 between the dividers 18 such that the battery cells are spaced apart from the dividers 18 by a gap. The mounts 18 may be formed of a rigid or compliant, thermally conductive material that improves heat transfer from the cells 12 to the dividers 18, for example from a flexible or rigid polymer, a thermally conductive rubber, etc. Similar mounts 30 may be used to attach the control electronics 14 to a divider 18 and to a side of the housing 16.

If the control electronics 14 are positioned within the housing 16, a cable 32 may connect the control electronics 14 to a connector 34 on an external surface of the housing 16. The cable 32 is physically and electrically connected to the external connector 34 such that the interior of the housing 16 maintains an airtight seal.

The cable 32 may pass operating information to, for example, an external monitoring system (not individually depicted for simplicity). One or more sensors 36, for example on the PCB 14 or elsewhere within the housing 16, may monitor conditions such as temperature and pressure within the housing 16. This information may be passed through the cable 32 to the external monitoring system. In another embodiment, the cable 32 and connector 24 may be replaced with a wireless system.

FIG. 2 further includes schematic depictions of battery cell wiring 37 and external battery connections 38 in accordance with known devices. The battery cell wiring 37 is physically and electrically connected to the external battery connections 38 such that the interior of the housing 16 maintains an airtight seal.

FIG. 2 further depicts a pressure relief device 40 such as a burst disk interposed between the interior of the housing 16 and an exhaust vent 42 and, more particularly, between a liquid cooling fluid or coolant pool 44 within the interior of the housing and the exhaust vent. Thus the exhaust vent 42 is in fluid communication with the interior of the housing upon activation of the pressure relief device 40.

The housing 16 is filled with the liquid cooling fluid 44 that is free to circulate horizontally and vertically through one or more fluid channels 46 within the housing 16 as described below. The cooling fluid 44 may be chemically stable and inert, an electrical insulator (i.e., dielectric), a thermal conductor, non-toxic, and nonflammable. The specific characteristics of the material used as the cooling fluid 44 may be matched for the specific battery chemistry. For example, the boiling temperature and pressure curve of the material may be matched with the allowable operating temperature of the battery chemistry. In an embodiment, the cooling fluid 44 may be a fluorinated liquid, for example a fluorocarbon such as Fluorinert™ available from 3M of St. Paul, Minn.

A level or volume of the cooling liquid 44 within housing 16 is sufficient to cover the battery cells 12, and may cover at least a portion of the control electronics 14. To improve thermal mixing of the cooling fluid 44, for example during movement of the battery system 10, the volume of the cooling fluid 44 within the housing 16 may be insufficient to completely fill the available space within the interior of the housing 16. In other embodiments, to maximize the quantity of fluid, the cooling fluid 44 may completely fill the available space within the interior of the housing 16.

The housing 16 is sealed to prevent leakage of the cooling fluid 44 or its vapor from the housing and to prevent air from entering the housing 16.

Normal operation during battery charging and discharging events will conduct heat from the battery cells 12 to the dividers 18. Heat will be transferred to the cooling fluid 44 by buoyancy-driven natural convection from the exposed battery cell walls and the wetted surfaces of the dividers 18. The cooling fluid 44 will circulate to the cooler surfaces of the housing 16 and dividers 18, where it will descend after transferring heat to the housing 16 and dividers 18. In normal operation, the fluid will circulate to result, primarily, in single-phase liquid heat transfer (i.e., convection transfer of heat through a single-phase liquid). Two-phase heat transfer may also occur as a lesser cooling contributor resulting from surface evaporation of the cooling fluid 44 and its condensation onto exposed internal housing surfaces. The amount of two-phase heat transfer will depend on the temperature of the exposed surface area within the interior of the housing 16 relative to the temperature of wetted surfaces.

Thermal conductance between battery cells 12, when the temperature of one battery cell is rising, will naturally decrease in stages via natural phenomena. First, provided the channel 46 has an adequately sized lower opening (feed), the wall temperature will increase which will, in turn, increase cooling fluid 44 circulation. This will reduce the bulk mixed flow temperature in the channel 46. If heating continues, the temperature of the cooling fluid 44 will increase beyond its boiling temperature such that fluid vapor will begin to form on hot surfaces and produce bubbles. The formation of bubbles will increase the void fraction (percent vapor) within the channel, thereby effectively decreasing fluid density. This lower density of fluid within the channel drives a thermosiphon and pulls cooling fluid from cooler locations.

As the fluid temperature increases, the internal pressure within the housing 16 will increase with the fluid vapor pressure. At a pre-determined internal pressure, which may be equal to the fluid vapor pressure at a temperature below the battery thermal runaway temperature, the pressure relief device 40 will rupture or otherwise activate to release vapor 48 from the interior of the housing 16 into the ambient as depicted in FIG. 2. A leak-tight upstream pressure regulator device 50 may be used in addition to the pressure relief device 40, or instead of the pressure relief device 40, to limit the venting of vapor 48 and the decrease in the cooling fluid 44 boiling temperature by maintaining the desired fluid vapor pressure. This allows a reconfigurable battery system 10 to continue to operate. Cooling of the failed battery cell will continue through two phase boiling and controlled venting of vapor 48. By providing a reconfigurable battery system 10, a sufficient quantity of cooling fluid 44 is designed to remain within the housing 16 so that the latent heat of vaporization of the cooling fluid 44 is greater than the thermal energy that could be released in event of a failed cell. A fluid volume may be increased with an auxiliary backup reservoir 52 of coolant fluid 54 that replaces any primary coolant fluid 44 that is vented as vapor 48 to increase the total energy capacity of the battery system 10. A duct 42 to an exterior of the vehicle into which the battery system 10 is installed, such as an aircraft, prevents vapors from being released into the aircraft interior.

Various other embodiments are also contemplated. For example, to improve the overpressure capacity or heating capacity of the cooling system, the dividers 18 may be manufactured to include a hollow core 56 that may be sealed such that the cooling fluid 44 cannot enter the hollow core 56. In the case of overpressure, a divider can include compliant walls which, under pressure, deflect into the hollow core to increase the interior volume within the housing 16 to allow some expansion of the volume of the housing interior under higher pressures. The dividers 18 may be manufactured to include a hollow core 56 that is in communication with the cooling fluid 44 to add increased area for heat transfer from the cell 12, to the divider 18, to the fluid 44. In the case of improved heating capacity, the hollow core 56 may be filled with a solid that is different from a material that forms an exterior of the divider 18.

Additionally, because the housing is sealed, the interior of the housing may be pressurized above standard pressure, for example to increase a boiling point of the cooling fluid 44. This may be advantageous using some battery chemistries depending on their desired operating temperature and the fluid temperature-pressure properties. In one embodiment, a pressure within the sealed housing during normal operating conditions may be limited to about 30 psia or less. In other embodiments, the sealed housing may be pressurized to between about 10 psia and about 80 psia, or between about 10 psia and about 30 psia, or between about 15 psia and about 45 psia, or between about 30 psia and about 80 psia. A pressure within the sealed housing may be sufficient to result in a fluid boiling temperature of between about 170° F. and about 180° F., for example 174° F.

Further, the dividers 18 that mechanically secure the battery cells 12 within the housing 16 may have various configurations depending on the strength required for normal operation and crash safety, heat transfer requirements, and mechanical compliance required for the coefficient of thermal expansion (CTE) and any state of charge volumetric changes. Heat transfer within the battery system includes heat transfer from the battery cells 12 to the cooling fluid 44 to cool normally operating and overheating battery cells, as well as heat transfer between the battery cells during normal operation to provide balanced operation of the battery cells within the battery system. The dividers 18 may be designed to balance these two types of heat transfer. Circulation of the cooling fluid 44 also pulls in thermal capacitance of containment structures such as the housing 16 and the fins 17. The divider design can be used to tailor the heat transfer and/or mechanical strength for a particular battery chemistry or a particular use of the battery system, whether for use in aviation, railroad, automobiles, etc.

Figure 3:
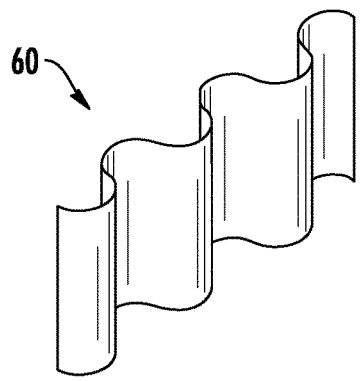
FIG. 3 is a perspective depiction of a divider design in accordance with an embodiment of the present teachings.
Figure 4:
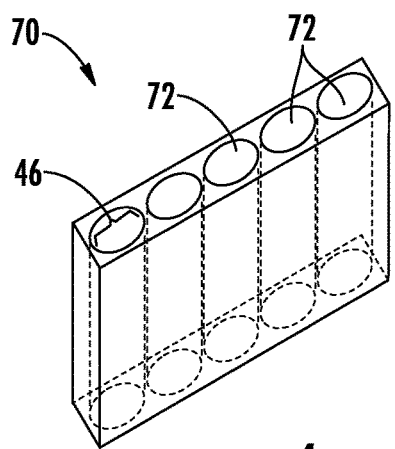
FIG. 4 is a perspective depiction of another divider design in accordance with an embodiment of the present teachings.
Figure 5:
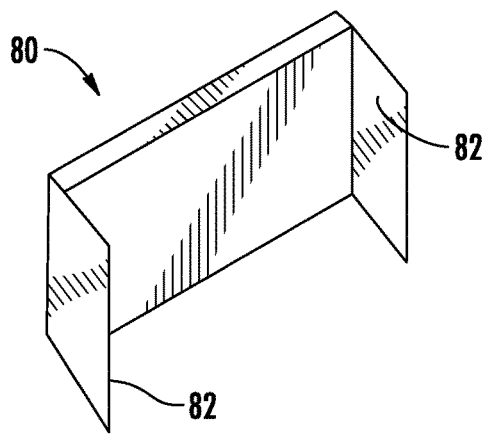
FIG. 5 is a perspective depiction of another divider design in accordance with an embodiment of the present teachings.

Thus the dividers 18 may be formed as a solid wall without hollow core 56, with a gas-filled, liquid-filled, or solid-filled core 56 using a design similar to that depicted in FIGS. 1 and 2. These dividers may have a high cell-to-cell heat transfer, a low cell-to-fluid heat transfer, and a high mechanical stiffness. Various other configurations may have different cell-to-cell heat transfer, cell-to-fluid heat transfer, or mechanical stiffness. For example, as depicted in FIG. 3, corrugated dividers 60 have an increased surface area over straight dividers and may have a low cell-to-cell heat transfer, a low heat transfer from the battery cells to the dividers, and a low mechanical stiffness. Dividers 70 including a plurality of vertical channels 72 through the divider that are open on the top and bottom of the divider 72 as depicted in FIG. 4, such that the plurality of channels 72 provide fluid channels 46 through the divider 70. These dividers 70 have a low cell-to-cell heat transfer, high heat transfer from the battery cell to the housing 16, and moderate mechanical stiffness. FIG. 5 depicts a solid divider 80 including side mounting tabs 82 that may be mounted to the housing 16. The dividers as described herein may be attached to the housing using mechanical techniques (screws, clamps, etc.) or chemical techniques (adhesives, polymer welding, etc.). Dimensions and materials of the housing 16, dividers 18, etc., may be selected for the requirements of the given application.

Electrically powered heating elements, which may be represented as element 56 in FIGS. 1 and 2, can be included internally within the dividers 18 to warm the battery cells 12 during cold weather operation to a nominal operating temperature to improve battery performance. The heating elements 56 may be powered using the battery cells 12 themselves or using an external power source connected to the battery system 10, for example, through connector 34. In operation, the heating elements 56 can be powered so that they activate to heat the battery cells 12 by heat transfer through the cooling fluid 44, direct radiant heating of the battery cells 12, or both.

A battery system in accordance with an embodiment of the present teachings includes a passive cooling system. A battery system 10 in accordance with one or more embodiments of the present teachings may provide improved battery life and safety as a result of this passive cooling of battery cells 12. A battery system 10 in accordance with an embodiment of the present teachings may be smaller and lighter in weight than conventional battery systems, as runaway overheating of more volatile battery chemistries such as lithium ion may be controlled. These more volatile battery chemistries provide a greater battery capacity than less volatile conventional chemistries such as nickel cadmium batteries but are more compact and lighter in weight. In contrast to some conventional battery systems that rely solely on a distance between battery cells to maintain appropriate heat levels, battery system heat levels with an embodiment of the present teachings use dividers and cooling fluid within a housing to maintain appropriate heat levels.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A battery system, comprising:
a sealed housing;
at least a first battery cell and a second battery cell, the first and second battery cells spaced apart from one another to define a divider gap extending between an upper surface of the first and second battery cells and a lower surface of the first and second battery cells, wherein the first battery cell and the second battery cell are sealed within the housing;
at least one divider sealed within the housing and interposed between the first battery cell and the second battery cell, wherein the at least one divider is spaced apart from a top surface of the sealed housing by a first housing gap and from a bottom surface of the sealed housing by a second housing gap;
a dielectric cooling fluid sealed within the housing, wherein the cooling fluid physically contacts the first battery cell, the second battery cell, the at least one divider, and the housing,
wherein the respective divider gap contains a single divider among the at least one divider such that the single divider is interposed between the first battery cell and the second battery cell and is spaced apart from the first and second battery cells, the single divider extending vertically between a top divider end and an opposing bottom divider end, the top divider end aligned approximately with the upper surface of the first and second battery cells and the bottom divider end aligned approximately with the lower surface of the first and second battery cells;
a pressure relief valve in the housing; and
a backup reservoir comprising coolant fluid configured to replace coolant fluid within the housing subsequent to activation of the pressure relief device.

2. The battery system of claim 1, further comprising: an exhaust vent exterior to the housing; and
the pressure relief device interposed within a fluid channel between the dielectric coolant fluid and the exhaust vent, wherein the exhaust vent is in fluid communication with the interior of the housing upon activation of the pressure relief device.

3. The battery system of claim 1, further comprising a fluid channel within the interior of the housing, wherein the fluid channel comprises the first housing gap and the second housing gap and the dielectric cooling fluid is free to circulate between the first housing gap and the second housing gap.

4. The battery system of claim 1, wherein an interior of the housing is pressurized to a pressure of between about 10 psia and about 30 psia during normal operating conditions.

5. The battery system of claim 1, further comprising:
an exhaust vent exterior to the housing;
the pressure relief device interposed within a fluid channel between the dielectric coolant fluid and the exhaust vent, wherein the exhaust vent is in fluid communication with the interior of the housing upon activation of the pressure relief device; and
a pressure regulator that limits venting of the coolant fluid during activation of the pressure relief device.

6. The battery system of claim 1, wherein the at least one divider is at least one corrugated divider.

7. The battery system of claim 1, wherein the at least one divider comprises a plurality of vertical channels through the at least one divider, wherein each vertical channel is open at a top of the divider and at a bottom of the divider to provide a fluid channel, wherein the cooling fluid is free to circulate through the plurality of vertical channels the at least one divider.

8. The battery system of claim 1, wherein the cooling fluid is a fluorocarbon.

9. The battery system of claim 1, wherein the at least one divider comprises a hollow core that is sealed such that the cooling fluid cannot enter the hollow core.

10. The battery system of claim 9, wherein the hollow core is filled with a liquid.

11. The battery system of claim 10, wherein the cooling fluid is a fluorocarbon and the hollow core is filled with a fluorocarbon.

12. The battery system of claim 9, wherein the hollow core is filled with a gas.

13. The battery system of claim 9, wherein the hollow core is filled with a solid that is different from an external material that forms the divider.

14. The battery system of claim 1, wherein the at least one divider comprises a powered heating element configured to heat the first battery cell and the second battery cell.

15. A battery system, comprising:
a sealed housing having an interior and an exterior;

a plurality of battery cells sealed within the interior of the sealed housing, the plurality of battery cells spaced apart from one another to define a plurality of divider gaps, each divider gap extending vertically from an upper surface of the battery cells and to a lower surface of the battery cells;

a plurality of dividers sealed within the interior of the housing, wherein each divider gap contains a single divider spaced apart from the plurality of battery cells and extending vertically between a top divider end and an opposing bottom divider end, the top divider end aligned approximately with the upper surface of the battery cells and the bottom divider end aligned approximately with the lower surface of the battery cells, each battery cell is separated from an adjacent battery cell by one of the dividers and the plurality of dividers are spaced apart from a top surface of the sealed housing by a first housing gap and from a bottom surface of the sealed housing by a second housing gap;

a dielectric cooling fluid sealed within the housing, wherein the cooling fluid physically contacts the plurality of battery cells, the plurality of dividers, and the housing;

an exhaust vent exterior to the housing;

a pressure relief device interposed within a fluid channel between the dielectric coolant fluid and the exhaust vent, wherein the exhaust vent is in fluid communication with the interior of the housing upon activation of the pressure relief device; and a backup reservoir comprising coolant fluid configured to replace coolant fluid within the housing subsequent to activation of the pressure relief device.

16. The battery system of claim 15, further comprising a fluid channel within the interior of the housing, wherein the fluid channel comprises the first housing gap and the second housing gap and the dielectric cooling fluid is free to circulate between the first housing gap and the second housing gap.

17. The battery system of claim 16, wherein the interior of the housing is pressurized to a pressure of between about 30 psia and about 80 psia during normal operating conditions.

18. The battery system of claim 17, wherein each of the plurality of dividers comprises a powered heating element configured to heat the plurality of battery cells.

* * * * *